US009628993B2

(12) United States Patent
Liu et al.

(10) Patent No.: US 9,628,993 B2
(45) Date of Patent: Apr. 18, 2017

(54) DETERMINING A LEGITIMATE ACCESS POINT RESPONSE

(71) Applicant: HEWLETT-PACKARD DEVELOPMENT COMPANY, L.P., Houston, TX (US)

(72) Inventors: Yongqiang Liu, Beijing (CN); Shijian Li, Beijing (CN); Jun Qing Xie, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/900,202

(22) PCT Filed: Jul. 4, 2013

(86) PCT No.: PCT/CN2013/078800
§ 371 (c)(1),
(2) Date: Dec. 21, 2015

(87) PCT Pub. No.: WO2015/000158
PCT Pub. Date: Jan. 8, 2015

(65) Prior Publication Data
US 2016/0149935 A1    May 26, 2016

(51) Int. Cl.
*H04W 12/08*    (2009.01)
*H04W 12/12*    (2009.01)
(Continued)

(52) U.S. Cl.
CPC ............ *H04W 12/08* (2013.01); *H04L 47/27* (2013.01); *H04L 47/34* (2013.01); *H04L 63/10* (2013.01);
(Continued)

(58) Field of Classification Search
CPC .................................... H04W 12/08
See application file for complete search history.

(56) References Cited

U.S. PATENT DOCUMENTS 4,653,048 A * 3/1987 Anderson .......... H04Q 11/0407
370/394
6,671,288 B1 * 12/2003 Onodera .................. H04L 1/16
370/469
(Continued)

FOREIGN PATENT DOCUMENTS

| CN | 101277229 A | 10/2008 |
| CN | 102014738 A | 4/2011 |
| EP | 2521389 A2 | 11/2012 |

OTHER PUBLICATIONS

Beyah et al.; Rogue access point detection using temporal traffic characteristics; Published in: Global Telecommunications Conference, 2004. GLOBECOM '04. IEEE; IEEE Xplore.*
(Continued)

*Primary Examiner* — Bradley Holder
(74) *Attorney, Agent, or Firm* — Hewlett Packard Enterprise Patent Department (57) ABSTRACT

A first request is sent from a station to an access point. The station receives a first response from the access point that includes a first sequence number, and stores the first sequence number. The station sends a second request to the access point and sets a waiting period for receiving a response from the access point. The station receives a second response from the access point and a third response from a second access point during the waiting period. The second response includes a second sequence number and the third response includes a third sequence number. The station determines that the second response is a legitimate response by comparing the second and third sequence numbers to the first sequence number.

6 Claims, 5 Drawing Sheets

(51) Int. Cl.
*H04W 48/14* (2009.01)
*H04L 29/06* (2006.01)
*H04W 12/10* (2009.01)
*H04L 12/801* (2013.01)
*H04L 12/807* (2013.01)
*H04W 84/12* (2009.01)

(52) U.S. Cl.
CPC ........ *H04L 63/126* (2013.01); *H04L 63/1416* (2013.01); *H04W 12/10* (2013.01); *H04W 12/12* (2013.01); *H04W 48/14* (2013.01); *H04W 84/12* (2013.01)

(56) References Cited

U.S. PATENT DOCUMENTS

| | | | | |
|---|---|---|---|---|
| 6,859,456 | B1* | 2/2005 | Hetherington | H04L 1/1841 370/230 |
| 6,862,354 | B1* | 3/2005 | McGrew | H04L 9/065 380/37 |
| 7,336,670 | B1* | 2/2008 | Calhoun | H04L 63/10 370/252 |
| 7,464,126 | B2* | 12/2008 | Chen | G06F 11/2064 707/655 |
| 7,808,958 | B1* | 10/2010 | Hernacki | H04W 12/12 370/229 |
| 2003/0185244 | A1* | 10/2003 | Wu | H04L 63/10 370/503 |
| 2004/0023640 | A1* | 2/2004 | Ballai | H04L 63/10 455/411 |
| 2005/0113090 | A1* | 5/2005 | Sharony | G01S 5/0252 455/436 |
| 2005/0185666 | A1 | 8/2005 | Raya et al. | |
| 2007/0079376 | A1* | 4/2007 | Robert | H04L 63/1408 726/23 |
| 2007/0115886 | A1* | 5/2007 | Davis | H04L 63/1408 370/331 |
| 2007/0186276 | A1 | 8/2007 | McRae et al. | |
| 2008/0002651 | A1* | 1/2008 | Nakano | H04K 3/22 370/338 |
| 2009/0135805 | A1* | 5/2009 | Lee | H04L 29/12132 370/350 |
| 2010/0146272 | A1 | 6/2010 | Centonza et al. | |
| 2010/0299725 | A1 | 11/2010 | Yamada | |
| 2011/0280180 | A1 | 11/2011 | McCann et al. | |
| 2012/0014335 | A1* | 1/2012 | Adachi | H04W 48/08 370/329 |
| 2012/0023552 | A1* | 1/2012 | Brown | H04L 63/14 726/3 |
| 2012/0054106 | A1 | 3/2012 | Stephenson et al. | |
| 2012/0134272 | A1* | 5/2012 | Vempati | H04L 43/10 370/241 |
| 2012/0201177 | A1* | 8/2012 | Adachi | H04L 1/0083 370/310 |

OTHER PUBLICATIONS

Bhagyavati et al; Wireless security techniques: an overview; Published in: Proceeding InfoSecCD '04 Proceedings of the 1st annual conference on Information security curriculum development; 2004; pp. 82-87; ACM Digital Library.*
International Search Report and Written Opinion, International Application No. PCT/CN2013/078800, Date: Apr. 3, 2014, pp. 1-13.
W. Carr, "Wi-Fi Certified Passpoint Architecture for Public Access," Aruba White Paper, Nov. 27, 2012, pp. 1-15, Aruba Networks, Inc.

* cited by examiner

DETERMINING A LEGITIMATE ACCESS POINT RESPONSE

BACKGROUND

Wireless capable devices rely on network resources such as a wireless network access point to connect to the Internet (or network). Accordingly, wireless devices may communicate with the access point to receive information for connecting to the network. An access point may provide network service/access to a plurality of wireless devices within a specified range. Thus, when a wireless device moves to a location serviced by the access point, the wireless device may communicate with the access point to receive information required to establish a network connection.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

The institute of electrical and electronics engineers (IEEE) 802.11u standard is an extension of the IEEE 802.11 family of standards to add features that improve interworking with external networks. The IEEE 802.11u standard improves the ability of stations to automatically discover, authenticate and use a nearby access point (AP), which provides a cellular network like mobile broadband experience for users. As used herein, a "station" is a device that has the capability to use the 802.11 protocol. For example, a station may be a laptop, a desktop PC, a personal digital assistant (PDA), an access point, or any other Wi-Fi enabled device. Thus, a station may be fixed, mobile, or portable.

An IEEE 802.11u enabled AP allows an unauthenticated station to query the capabilities of the AP and its backhaul access network prior to associating with the AP. Generic Advertisement Service (GAS) is the major component in the IEEE 802.11u standard that enables such information element (IE) query/request and response between the station and the AP. Thus, a station may send GAS requests/queries to an access point and receive GAS responses from the access point. The GAS queries and responses may be formatted using a number of protocols such as an access network query protocol (ANQP). ANQP defines a number of information elements (IE) for stations to request information (e.g., location, cellular network roaming, etc) from the access point. As used herein an "access point" is a device that serves as the hub of a local wireless network, and may also be the gateway between a wired network to the wireless network. For example, an access point may be a base station, a mobile device, or any other device.

The general message exchange procedure of GAS/ANQP generally includes the following steps: 1) A requesting station sends an ANQP query encapsulated in a GAS initial request message to the access point; 2) The access point allocates a memory block (e.g., control block) to store necessary information of the query, such as the station's MAC address and the dialog identification, and then sends an internal query to a centralized advertisement server (e.g., a wireless operator's core network) that stores all the ANQP information elements; 3) The access point answers the requesting station with a GAS initial response message, where a comeback delay field indicates that the station is to come back in 'X' seconds to fetch the GAS response, after the access point has received the station's information from the advertisement server; 4) 'X' seconds later, the station sends a GAS comeback request message to fetch the buffered response from the access point. If the size of the response exceeds a maximal packet delivery unit (MPDU), the response may be split into multiple fragments and delivered via a sequence of comeback requests/responses. As used herein, a "dialog" is the query and response process between the station and the access point. For example, during a query/response process (i.e., dialog), a station may discover and identify network services provided by the access point or other external networks before associating with the network. Further, during the query process, the station may request connectivity information (e.g., domain name, channel information, etc) from the access point.

However, the GAS messages (i.e., GAS requests and GAS responses) between the access point and the stations are merely authenticated by the source address (e.g., medium access control (MAC) address) of the access point and the dialog ID in the frame received from the access point, which may make the stations vulnerable to attacks. For example, an attacker (e.g., a rogue access point) can silently monitor frames transmitted between the station and the access point, and upon capturing a GAS query/request from the station to the access point, the attacker can forge a GAS response with a failure code and send it to the station. The station may therefore assume that the access point is unavailable and may refrain from associating with the access point.

The following example illustrates how a bogus GAS attack may be implemented by a rogue access point. A station may send a GAS initial request message to an access point. An attacker listening on the same channel of the access point may capture the GAS initial request message, and may forge an initial response message with: a) source MAC address=access point's MAC address; b) status code=failure code; and c) dialog ID=dialog ID in incoming frame. The attacker may then transmit the forged initial response message to the station. The station may receive the bogus GAS initial response message first (i.e., before the legitimate GAS initial response message from the access point), detect the failure status code, report a failure occurred for the specific dialog, and then delete the information block for this dialog. When the legitimate GAS initial response message finally arrives at the station, the station is unable to find the corresponding dialog and may ignore or delete the message. Thus, if the bogus GAS response reaches the station before the legitimate GAS response message, it may break the entire dialog. Such an attack may prevent the station from associating and/or connecting with the access point.

Examples disclosed herein provide a solution to the above GAS response attack by distinguishing between a legitimate GAS response message and a bogus GAS response message (e.g., a GAS response message from an attacker or rogue access point). The described examples filter out the bogus response with a high probability to protect the GAS query process between IEEE 802.11u enabled stations and an AP. Further, the described examples can be implemented without breaking compliance with the IEEE 802.11u standard, resulting in easy deployment in current Wi-Fi networks.

In one example, a method includes sending a first request from a station to an access point. The method includes receiving a first response from the access point, where the first response includes a first sequence number, and storing the first sequence number at the station. The method includes sending a second request from the station to the access point and setting a waiting period for receiving a response from the access point. The method also includes receiving a second response from the access point and a third response from a second access point during the waiting period, where the second response includes a second sequence number and where the third response includes a third sequence number. The method includes determining that the second response is a legitimate response by comparing the second and third sequence numbers to the first sequence number.

In another example, a station includes a transceiver to communicate with an access point and a controller coupled to the transceiver. The controller is to store a sequence number of a probe response received by the transceiver in response to a probe request sent by the transceiver. The controller is to set a wait time to receive a response from the access point in response to a generic advertisement service (GAS) request sent by the transceiver. The controller is further to distinguish between a legitimate GAS response received from the access point and a bogus GAS response received from a rogue access point based on a comparison of the probe response sequence number, the legitimate GAS response sequence number, and the bogus GAS response sequence number.

In another example, a non-transitory computer-readable storage medium includes instructions that, when executed by a processor of a station, cause the processor to initiate transmission of a probe request to an access point, and store a sequence number associated with a probe response received from the access point as a base sequence number. The instructions are executable to initiate transmission of a generic advertisement service (GAS) request to the access point and set a wait time to receive a GAS response from the access point. The instructions are executable to receive a first GAS response from the access point and a second GAS response from a second access point, during the wait time. The instructions are also executable to determine which of the first GAS response and the second GAS response is a legitimate GAS response based on a comparison of the base sequence number of the probe response to a first sequence number of the first GAS response and to a second sequence number of the second GAS response.

Figure 1:
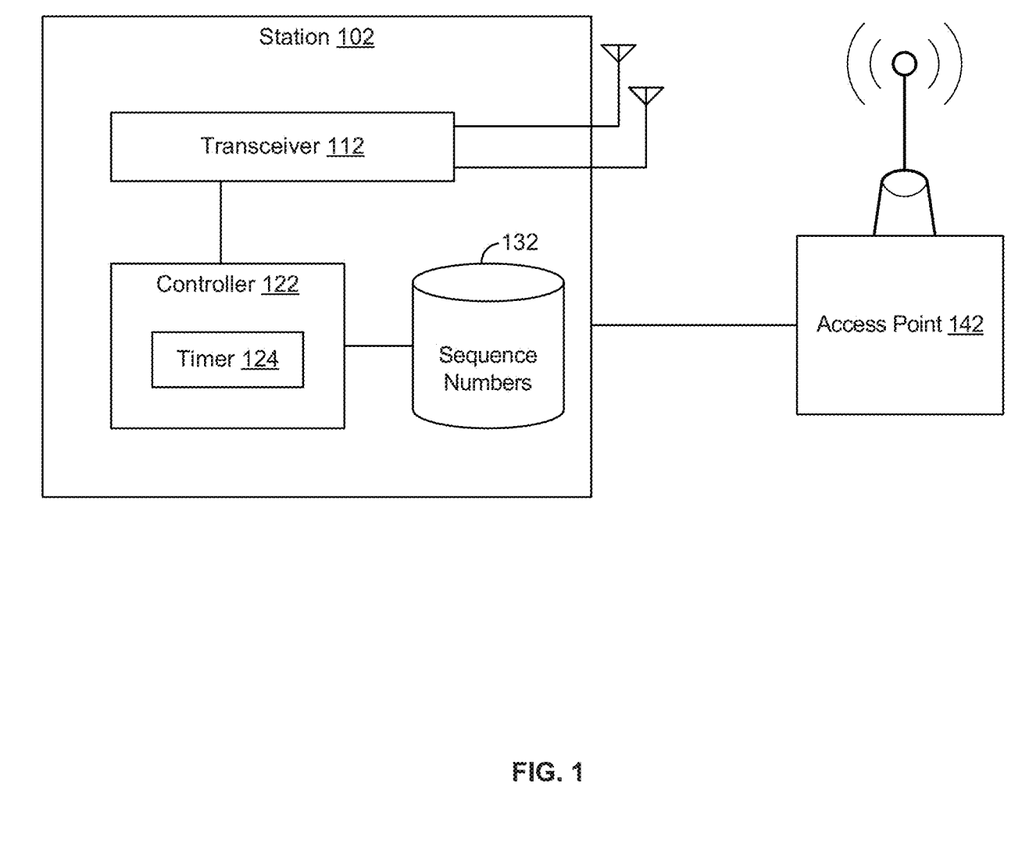
FIG. 1 is a block diagram of a station for determining a legitimate access point response, according to one example.

With reference to the figures, FIG. 1 is a block diagram of a station 102 for determining a legitimate AP response, according to one example. Station 102 may be, for example, a smartphone, a tablet, a cellular device, a personal digital assistant (PDA), a laptop computer, a notebook computer, or any portable wireless capable device. Station 102 includes a transceiver 112 coupled to a controller 122.

Station 102 may communicate with access point 142 via the transceiver 112. Accordingly, transceiver 112 may include one or more antennas for transmitting and receiving data/frames from the access point 142. Station 102 and access point 142 may be IEEE 802.11u compliant devices. Controller 122 may be configured to manage and control the message exchange between the station 102 and the access point 142 to determine a legitimate access point response from a bogus response from a rogue access point.

Controller 122 may be a general purpose processor, for example, for controlling the above message exchange procedure on the station 102 side. Controller 122 may be coupled to the transceiver 112 and to a storage device 132 of the station 102. Controller 122 may initiate the transmission of a probe request from the station 102 to the access point 142, and leverage the availability of a sequence number field in a frame such as a 12-bit sequence number in IEEE 802.11 frames to distinguish between legitimate responses from the access point 142 and bogus responses from rogue access points.

To detect available access points, IEEE 802.11 protocols define a procedure to actively retrieve meta-information of access points by using a probe request and a probe response. When a station transmits a probe request to a specific access point, the access point should send back a probe response with an information element indicating functionalities supported by the access point. Thus, controller 122 can leverage the availability of the probe request/response messaging in the IEEE 802.11 family of standards by initiating the transmission of a probe request from the station 102 to the access point 142. Prior to initiating the GAS dialog, the controller 122 can initiate the transmission of a probe request from the station 102 to the access point 142. It should be noted that the probe request/response and GAS response/request messages are sent before the station 102 is associated with the access point 142 (i.e., while the station 102 is in a non-associated state relative to the access point 142).

Because every IEEE 802.11 frame has a 12-bit sequence number field that is automatically updated by a network card of the sending device (e.g., access point 142), controller 122 can store and track the sequence number of frames/responses received from the access point 142. Thus, controller 122 can leverage the availability of a 12-bit sequence number field in the probe response from the access point 142. The field is automatically filled by the firmware of the network card. Thus, for example, a network card of the access point 142 may keep a counter (e.g., 'c') to record a next sequence number. When the network card receives a frame to transmit, the network card may fill 'c' into the frame and let 'c' increment by one, for example.

Thus, controller 122 can store the sequence number of the probe response received from the access point 142 in the storage device 132. This sequence number may be used as a base sequence number for comparing subsequent sequence numbers for responses received from the access point 142.

Controller 122 can then initiate the transmission of a GAS request from the station 102 to the access point 142 and set a timer 124 to track a waiting time to receive a response from the access point 142. Upon expiration of the waiting time, controller 122 can compare the sequence numbers of multiple GAS responses received from the access point 142 and any rogue access point.

For example, station 102 may receive a legitimate GAS response with a particular sequence number and a bogus GAS response with another sequence number. Controller 122 can distinguish between the legitimate GAS response and the bogus GAS response based on a comparison of the legitimate GAS response sequence number and the bogus GAS response sequence number to the base sequence number (of the probe response).

In particular, the legitimate GAS response is identified when the distance of the legitimate GAS response sequence number to the base sequence number is less than the distance of the bogus GAS response sequence number to the base sequence number. In other words, the controller 122 selects the legitimate GAS response if the sequence number of the legitimate GAS response is closer to the base sequence number than the sequence number of the bogus GAS response. Thus, the controller 122 is able to determine a legitimate GAS response from a legitimate access point by modifying the GAS messaging protocol by transmitting a probe request and recording the sequence number of the probe response before a true initial GAS request is being transmitted. In one example, the distance of the legitimate GAS response sequence number to the base sequence number is the difference (e.g., absolute difference) between the legitimate GAS response sequence number and the base sequence number. Similarly, the distance of the bogus GAS response sequence number to the base sequence number is the difference between the bogus GAS response sequence number and the base sequence number. Thus, the controller 122 may identify or select an access point associated with a GAS response with a sequence number that is closest to the base sequence number as the legitimate access point.

Figure 2:
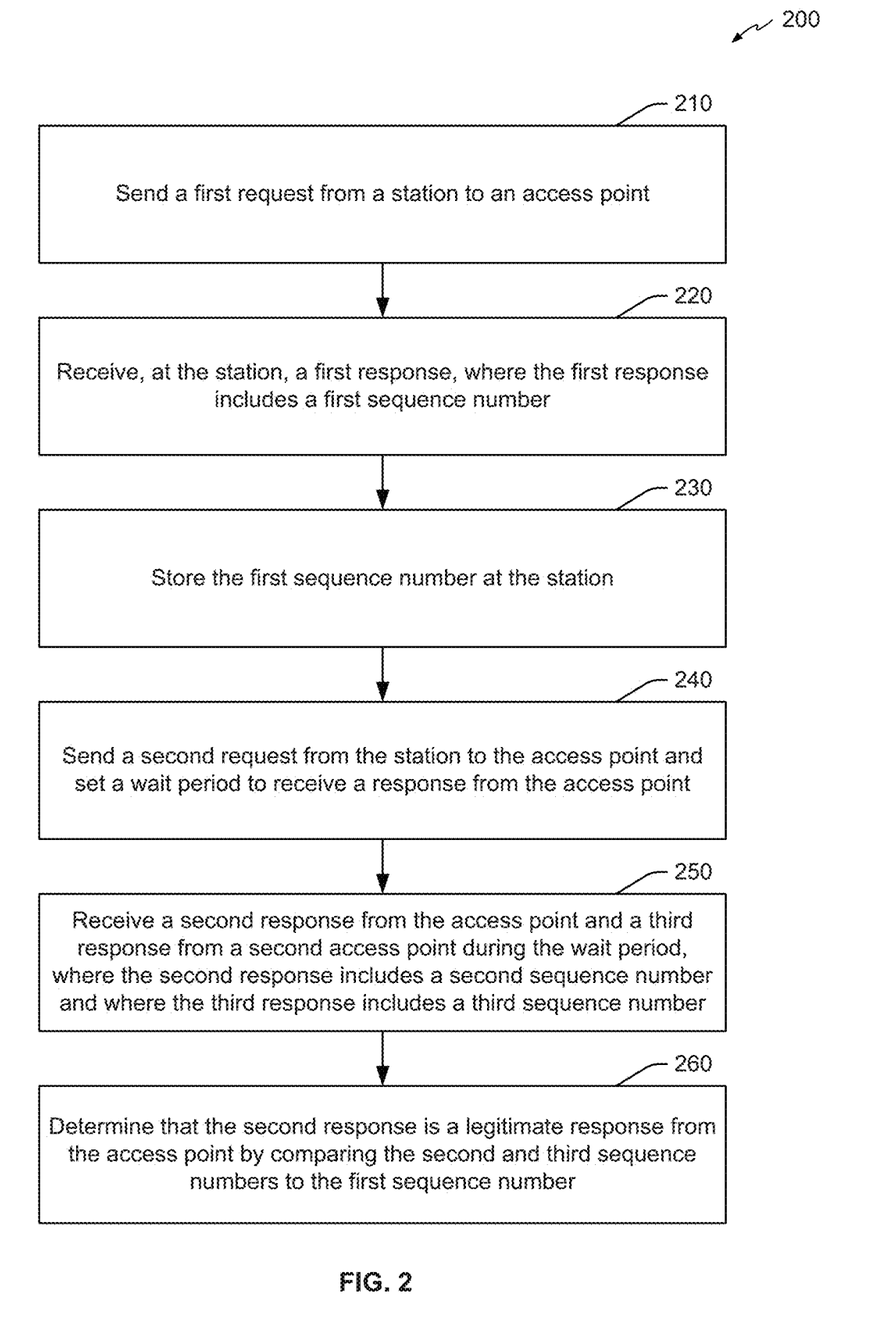
FIG. 2 is a flowchart of a method for determining a legitimate access point response, according to one example.

FIG. 2 is a flowchart of a method 200 for determining a legitimate access point response, according to one example. Method 200 may be implemented, for example, in the form of executable instructions stored on a non-transitory computer-readable storage medium and/or in the form of electronic circuitry.

Method 200 includes sending a first request from a station to an access point, at 210. For example, the station can transmit an IEEE 802.11 standard probe request to the access point. Method 200 includes receiving a first response from the access point, where the first response includes a first sequence number, at 220, and storing the first sequence number at the station, at 230. For example, the station may receive an IEEE 802.11 standard probe response from the access point. The probe response includes a sequence number which may be stored at a storage medium of the station. The sequence number may be stored as a base sequence number for comparing subsequent responses received from multiple access points.

Method 200 includes sending a second request from the station to the access point and setting a wait period to receive a response from the access point, at 240. For example, the station may send a GAS request to the access point and set a timer to expire after a period of time.

Method 200 includes receiving a second response from the access point and a third response from a second access point during the waiting period, where the second response includes a second sequence number and where the third response includes a third sequence number, at 250. For example, during the waiting period, the station may receive at least one GAS response (e.g., legitimate GAS response) from the access point and another GAS response (e.g., a bogus GAS response) from an attacker (e.g., a rouge access point). The legitimate GAS response and the bogus GAS response may each include a corresponding sequence number.

Method 200 includes determining that the second response is a legitimate response from the access point based on a comparison of the second and third sequence numbers to the first sequence number, at 260. For example, the station may compare the distance of the legitimate GAS response sequence number to the base sequence number against the distance of the bogus GAS response sequence number to the base sequence number. If the distance of the legitimate GAS response to the base sequence number is less than the distance of the bogus GAS response to the base sequence number, the legitimate GAS response is selected and identified as such.

Figure 3:
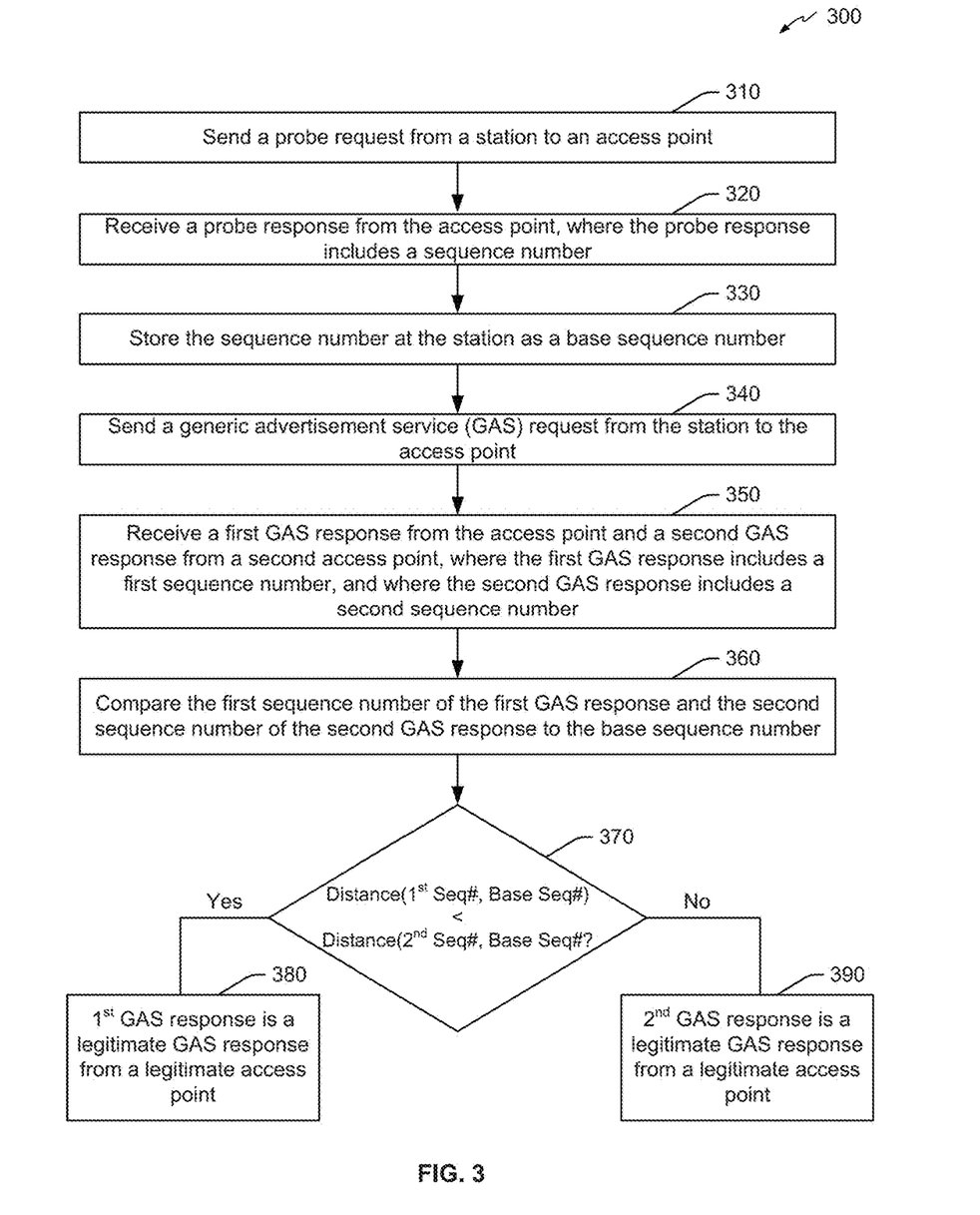
FIG. 3 is a flowchart of a method for determining a legitimate access point response, according to one example.

FIG. 3 is a flowchart of a method 300 for determining a legitimate access point response, according to one example. Method 300 may be implemented, for example, in the form of executable instructions stored on a non-transitory computer-readable storage medium and/or in the form of electronic circuitry.

Method 300 includes sending a probe request from a station to an access point, at 310, receiving a probe response from the access point, at 320, where the probe response includes a sequence number, and storing the sequence number at the station as a base sequence number, at 330.

Method 300 includes sending a GAS request from the station to the access point, at 340, and receiving a first GAS response from the access point and a second GAS response from a second access point, at 350, where the first GAS response includes a first sequence number, and where the second GAS response includes a second sequence number.

Method 300 includes comparing the first sequence number of the first GAS response and the second sequence number of the second GAS response to the base sequence number, at 360. If the distance between the first sequence number and the base sequence number is less than the distance between the second sequence number and the base sequence number, at 370, then method 300 includes determining that the first GAS response is a legitimate GAS response from a legitimate access point, at 380. If however, at 370, it is determined that the distance between the first sequence number and the base sequence number is greater than the distance between the second sequence number and the base sequence number, the method 300 includes determining that the second GAS response is the legitimate GAS response from a legitimate access point, at 390.

Figure 4:
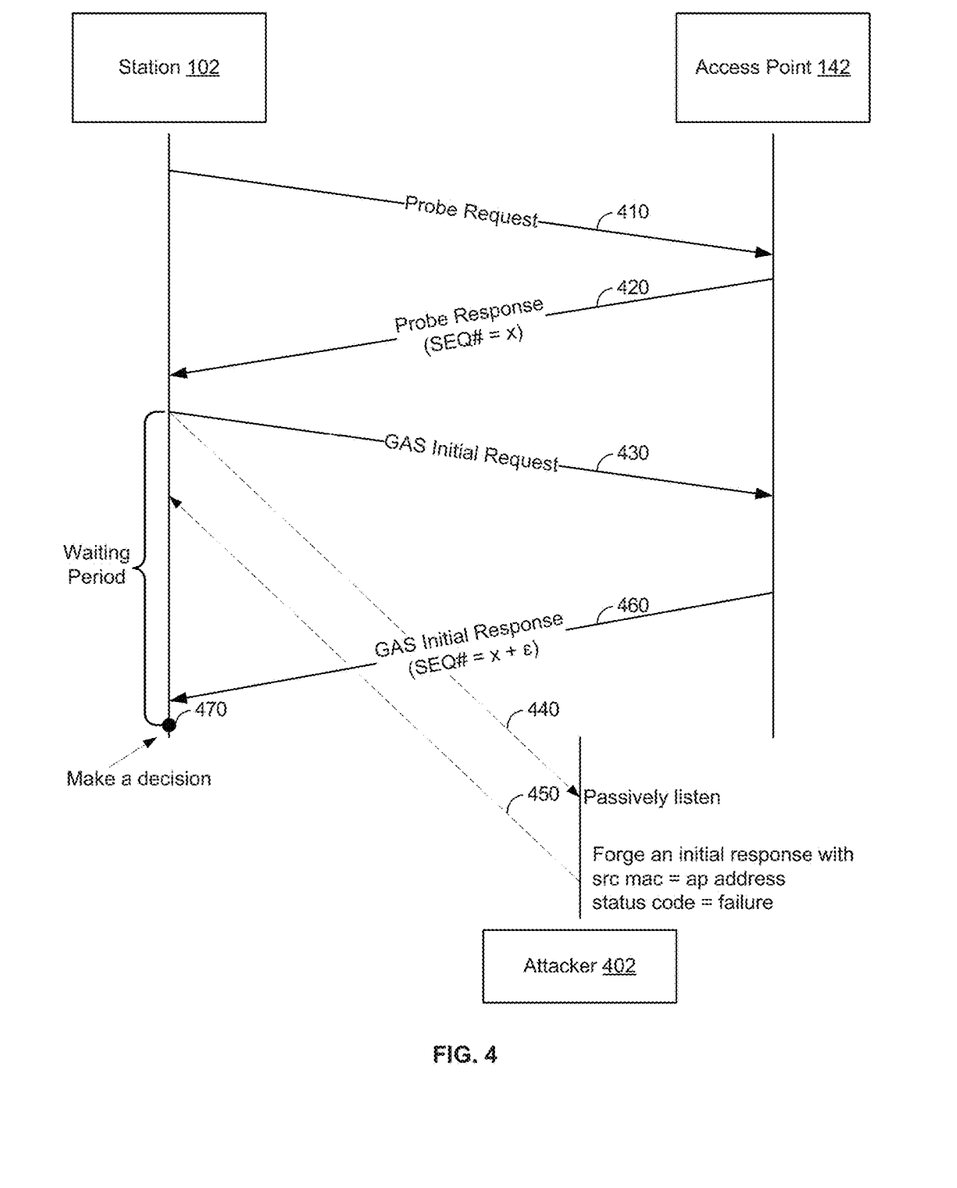
FIG. 4 is a diagram of a method for determining a legitimate access point response, according to one example.

FIG. 4 is a diagram of a method for determining a legitimate access point response, according to one example. In the example of FIG. 4, the station 102 and the access point 142 of FIG. 1 are shown. FIG. 4 further depicts an attacker 402 (e.g., a rogue access point).

At a first time, the station 102 may send a probe request message to the access point 142, at 410. The access point 142 may send a probe response message to the station 102, at 420. The probe response message may have a sequence number of 'x,' and the station may record the sequence number of the probe response message into a dialog block as a base sequence number.

The station 102 may send a GAS initial request message to the access point 142, at 430, and set a waiting period (e.g., set a timer) for receiving a response from the access point 142. Attacker 402 passively listening on the same channel of the access point 142 may capture the GAS initial request, at 440. The attacker 402 may forge a GAS initial response (similar what the access point 142 would send), and send the forged/bogus GAS initial response to the station 102, at 450. For example, the attacker 402's bogus initial GAS response may include a source address of the access point 142 and a failure code. The station 102 may receive the bogus initial GAS response from the attacker 402 and store it into a frame buffer.

The access point 142 may send a legitimate GAS initial response having a sequence number of 'x+$\epsilon$,' at 450, where the variable '$\epsilon$' is based on a throughput and/or traffic load of the access point 142 (e.g., no more than 10). The station 102 may receive the legitimate GAS initial response and stores it in the frame buffer. Upon expiration of the waiting time, at 470, the station 102 will select the frame in the frame buffer with the nearest sequence number from the base sequence number as the legitimate GAS initial response from the access point 142.

Figure 5:
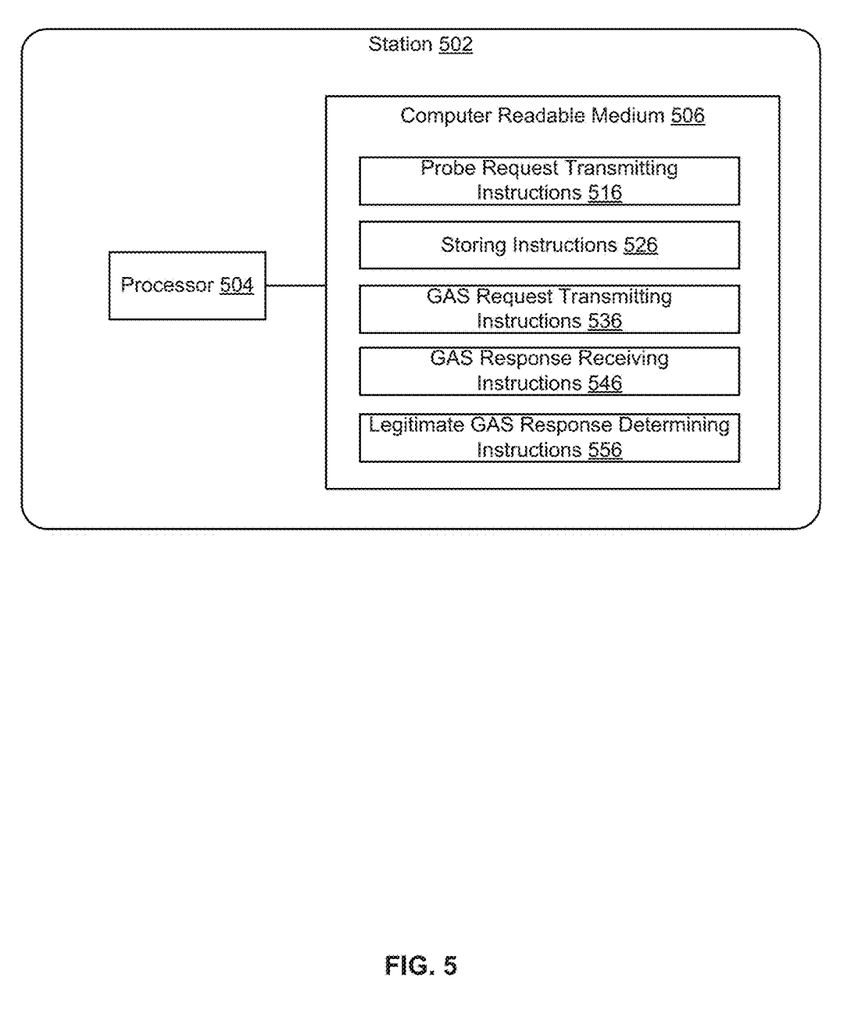
FIG. 5 is a block diagram of a station including computer-readable medium for determining a legitimate access point response, according to one example.

FIG. 5 is a block diagram of a station 502 including computer-readable medium for determining a legitimate access point response, according to one example. The device 502 can include a non-transitory computer-readable medium 506. The non-transitory computer-readable medium 506 can include instructions 516-556 that if executed by a processor 504 can cause the processor to distinguish between a legitimate access point response and a bogus response.

For example, probe request transmitting instructions 516 are executable to initiate transmission of a probe request to an access point. Storing instructions 526 are executable to store a base sequence number associated with a probe response received from the access point. GAS request transmitting instructions 536 are executable to initiate transmission of a GAS request to the access point, and to set a wait time to receive a GAS response from the access point. GAS response receiving instructions 546 are executable to receive a first GAS response and a second GAS response from the access point and from a second access point, respectively, during the wait time. Legitimate GAS response determining instructions are executable to determine which of the first GAS response and the second GAS response is a legitimate GAS response based on a comparison of the base sequence number of the probe response to a first sequence number of the first GAS response and to a second sequence number of the second GAS response.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of examples, those skilled in the art will appreciate numerous modifications and variations therefrom. It is intended that the appended claims cover such modifications and variations as fall within the true spirit and scope of the invention.

What is claimed is:

1. A method comprising:
    sending a first request from a wireless station to a first wireless access point;
    receiving, at the station, a first response from the first access point, wherein the first response includes a first sequence number;
    storing the first sequence number at the station;
    sending a second request from the station to the first access point and setting a waiting period for receiving a response from the first access point;
    receiving a second response from the first access point and a third response from a second wireless access point during the waiting period, wherein the second response includes a second sequence number and wherein the third response includes a third sequence number;
    determining that the second access point is a bogus access point if a distance between the third sequence number and the first sequence number is less than the distance between the second sequence number and the first sequence number.

2. The method of claim 1, wherein the first request is a probe request, wherein the first response is a probe response, wherein the second request is a generic advertisement service (GAS) request, wherein the second response is a GAS response, and wherein the third response is a bogus GAS response from a bogus access point.

3. The method of claim 2, wherein the probe request and the GAS request are sent while the station is in a non-associated state relative to the first access point.

4. The method of claim 2, wherein the GAS request includes a request for network connectivity information for connecting the station to the second access point.

5. The method of claim 1, wherein the first, second, and third sequence numbers are 12-bit numbers.

6. The method of claim 1, wherein the first sequence number is x and the second sequence number is $x+\epsilon$, wherein x and $x+\epsilon$ are integers chosen from 0 to 4095, and wherein $\epsilon$ is dependent upon the throughput of the second access point.

* * * * *